United States Patent [19]

Galer et al.

[11] 4,286,991

[45] Sep. 1, 1981

[54] VERY HIGH EARLY STRENGTH CEMENT

[75] Inventors: Richard E. Galer, Hanover Park; Paul C. Webb, Arlington Heights, both of Ill.

[73] Assignee: United States Gypsum Company, Chicago, Ill.

[21] Appl. No.: 143,666

[22] Filed: Apr. 25, 1980

[51] Int. Cl.³ .............................................. C04B 7/352
[52] U.S. Cl. ....................................... 106/90; 106/92; 106/104; 106/315
[58] Field of Search ..................... 106/90, 92, 104, 315

[56] References Cited

U.S. PATENT DOCUMENTS

| | | | |
|---|---|---|---|
| 3,860,433 | 1/1975 | Ost et al. ................................. | 106/89 |
| 3,885,985 | 5/1975 | Serafin et al. .......................... | 106/92 |
| 3,973,978 | 8/1976 | Nakagawa et al. ..................... | 106/95 |
| 4,058,407 | 11/1977 | Ray ....................................... | 106/92 |
| 4,088,504 | 5/1978 | Collepardi ............................. | 106/92 |

*Primary Examiner*—James Poer
*Attorney, Agent, or Firm*—Robert M. Didrick; Robert H. Robinson; Samuel Kurlandsky

[57] ABSTRACT

A combination of a hydroxy polycarboxylic acid and a starch hydrolyzate improves the compressive strength at early and late ages of a calcium sulfoaluminate cement.

14 Claims, No Drawings

VERY HIGH EARLY STRENGTH CEMENT

This invention relates to high aluminate cements which produce upon hydration a substantial amount of tricalcium aluminosulfate hydrates. It particularly relates to cement compositions of this type which contain a synergistic combination of a saccharide and a hydroxy polycarboxylic acid. Further, it relates to high aluminte cements which may be handled and transported for a longer period of time before setting than is usual with such cements. More particularly, it relates to cements containing the ternary compound, $3CaO.3Al_2O_3.CaSO_4$, herein after referred to as $C\bar{S}A$.

The economy and versatility of Portland cements, along with their high ultimate strengths, have made them pre-eminent among hydraulic cements despite their practical limitations of being slow to set and slow to develop the strength necessary to be self-supporting. The development of Type III Portland cement was an early response to the need for a faster setting, early strength cement. Calcium halo-aluminates have been incorporated into Portland cement compositions to achieve shortened but controllable setting times. Mixtures of a halo-aluminate cement and a calcium sulfate anhydrite have been offered as early strength cements. Cement mortars containing $C\bar{S}A$, calcium sulfate and dicalcium silicate set quickly and develop compressive strengths of about 2900 psi and higher within 24 hours after mixing with water.

The setting times for many of these early strength cements however, is too fast—not enough time is allowed for mixing, transporting, and proper placing. This problem was addressed to Nakagawa et al in U.S. Pat. No., 3,973,978. The solution proposed therein was to prepare two separate mixtures—a Portland cement paste and a quick hardening agent—and then mixing the two at the job site. The need for special equipment such as a Y-tube, metering apparatus and an additional mixer is apparent from the description of the patented method.

The quick hardening agent of Nakagawa et al optionally contains a setting retarder and/or a quick hardening accelerator. The setting retarders listed are the organic carboxylic acids conventionally used, such as gluconic, tartaric salicylic, citric, and malic acid. The hydroxides and carbonates of alkaline earth metals and alkali metals are described as quick hardening accelerators.

The U.S. Pat. No. 3,860,433, Ost et al teach that very high early strength cements containing $C\bar{S}A$, calcium sulfate and dicalcium silicate usually can be produced to have an initial set in about 20 minutes but that conventional retarders such as sucrose, borid acid, and mucic acid (i.e. tetrahydroxyadipic acid) may be added.

A water-repelling and set-retarding admixture for incorporation in Portland cements and other hydraulic cements is taught by Serafin et al in U.S. Pat. No. 3,885,985. Serafin et al teach the use of many various materials and mixtures thereof as set-retarding agents. Included among these are polyhydrosy polycarboxylic compounds and saccharides such as glucose, fructose, lactose, sucrose, starch and cellulose.

According to U.S. Pat. No. 4,058,407, combinations of admixtures are frequently used in hydraulic cements to achieve certain results or overcome inefficiencies, such as where an admixture does not produce a sufficient improvement in the compressive strength or does not effect the desired degree of retardation. Several admixtures, such as lignosulfonates, salts of hydroxycarboxylic acids, sugars and polysaccharides are listed as having the multiple effects of water reduction, set retardation and compressive strength improvement.

Now, it has been discovered, however, that a starch hydrolyzate accelerates the setting of the very high early strength cements containing $C\bar{S}A$. It has also been discovered that the hypothetical cumulative effect of the hydrolyzate and a hydroxy polycarboxylic acid would be a lower compressive strength than that of the cement with neither admixture whereas the observed effect of a combination thereof is greater than the cumulative effect.

It is an object of this invention, therefore, to provide a hydraulic cement composition having a high early strength when hydrated.

It is another object of this invention to provide such a cement composition having a compressive strength which is synergistically increased by a combination of admixtures whose hypothetical cumulative effect would be to decrease the compressive strength.

These and other objects which will become apparent from the following disclosure are achieved by a cement composition which comprises, on a dry weight basis, from about 3.75% to about 40% of $C\bar{S}A$, from about 0.1% to about 5% of lime, from about 3% to about 35% calcium sulfate, from about 0.1% to about 2% of a hydroxy polycarboxylic acid, from about 0.25% to about 4% of starch hydrolyzate solids from a hydrolyzate having a dextrose equivalent of from about 1 to 100, and dicalcium silicate to make up the substantial remainder.

The dicalcium silicate generally is present in amounts ranging from about 10% to about 90% of the total dry weight of the composition; preferably, it constitutes about 40% or more of the cement composition.

A preferred composition comprises from about 10% to about 30% of $C\bar{S}A$. Particularly preferred is a composition comprising from about 15% to about 25% of $C\bar{S}A$.

Because the amount of water present in specific fractions of a hydrolyzate will vary from one to the other, the amount of hydrolyzate used in this invention is expressed in terms of the solids content, that is, the substantially water-free hydrolyzate.

The dextrose equivalent (D.E.) of a starch hydrolyzate is the total amount of reducing sugars, expressed as anhydrous dextrose, present in the dry hydrolyzate. Glucose, dextrose, maltose and other disccharides, oligo-saccharides and higher polysaccharides, and mixtures of two or more of said saccharides are examples of a starch hydrolyzate. Corn syrup is such a mixture and it usually has a D.E. of from about 30 to about 70. Corn sugars are another such mixture, having a D.E. of from about 70 to 100. Corn molasses, the mother liquor pressed or centrifuged from corn sugar crystallization liquors, is another example. Often, the commercial molasses will contain considerable amounts of corn syrup and thus may have a D.E. of from about 30 to about 60 but the molasses may have a lower D.E. A starch hydrolyzate having a D.E. of from about 30 to about 70 is preferred, particularly corn syrup and corn molasses.

The hydroxy polycarboxylic acid contemplated in this invention is exemplified by citric acid, tartaric acid, malic and mucic acid. It contains up to about 6 carbon atoms and up to about 4 hydroxyl groups. Citric acid is preferred.

It is evident that the introduction of the acid into a system containing basic calcium will result in the in situ formation of the calcium salt. Therefore, other soluble sources of the carboxylate ion re contemplated as an admixture in this invention.

The admixtures may be used in their solid forms but also as aqueous solutions. Dilute aqueous solutions of the admixtures may be used as all or part of the mix water when the cement is used to make a paste, grout, mortar or concrete.

The hypothetical cumulative effect of the hydrolyzate and the hydroxy polycarboxylic acid on the ultimate compressive strength of the hydrated cement composition is negative for the entire range of concentrations contemplated in this invention. In some instances, the ultimate strength of compositions containing the admixture combination is also less than the control composition (containing neither admixture) but the early (i.e., 24 hour) strength is greater than that of the control in all instances. For some applications of the cement composition it may be desirable to sacrifice a small degree of ultimate strength in order to gain an increased early strength.

The ultimate strength of compositions containing the admixture combination is, however, greater than it would be if the hypothetical cumulative effect of the admixtures were operative. This is also true in the case of the 24 hour strength except in some instances at the higher concentrations of hydrolyzate solids. A preferred cement composition contains from about 0.1% to about 2% of the acid and from about 0.25% to about 2% hydrolyzate solids. A more preferred cement composition contains from about 0.5% to about 2% of the acid and from about 0.5% to about 2% of the hydrolyzate solids.

The composition contemplated in the invention includes the dry cement composition, neat pastes thereof, grouts, mortars, and concrete mixes. The addition of the admixture may be made, according to whether the admixture is in its solid form or in solution, at the time of preparing the dry cement or when the composition is mixed with water at a mixing plant or at the job site.

The following specific examples illustrate further the method and composition of this invention. All concentrations stated herein are in terms of percentage based upon the total weight of dry cement composition unless otherwise indicated.

EXAMPLE 1

Sand and cement at a ratio of 2.75 to 1 are charged to a mixer. The calculated compound composition of the cement is 18.9% C$\bar{S}$A, 22.2% calcium sulfate, 46% dicalcium silicate, 1.6% tetracalcium aluminoferrite, and 4.4% lime. Its oxide analysis is as follows: 53.1% CaO, 9.8% $Al_2O_3$, 0.5% $Fe_2O_3$, 16.1% $SiO_2$, 15.6% $SO_3$, 0.7% $Na_2O$ and minor amounts of the oxides of magnesium, titanium and potassium. The dry materials are mixed for two minutes before the mix water, an aqueous solution of citric acid, and corn syrup (44° Be, D.E.=62) are added. Mixing is continued for three minutes.

The percentage of citric acid and corn syrup, and the water/cement ratio (W/C) are given in the following table, along with compressive strength test results for each mortar.

The testing was carried out on two-inch cubes of mortar which had been cured in a mold under a moist atmosphere for 3 hours before being stripped from the mold. Moist air curing is continued for another 21 hours. The compressive strength of one cube from each mortar is determined 24 hours after the addition of water. Curing of the remaining cubes is continued under water for 182 days, at which time the compressive strength of each mortar is determined again.

It is generally accepted that the compressive strengths of a hydrated cement composition is roughly inversely proportional to the water/cement ratio. To compensate for the differing water/cement ratios used, therefore, the observed compressive strength values are adjusted to indicate what the strengths would be at a constant ratio of 0.623, which is the ratio used in the control composition (i.e., containing neither admixture).

It is recognized that the relation of compressive strength to the water/cement ratio is not fully linear but the adjusted strength values do indicate the relative ability of an admixture to affect the strength development of the cement composition. The large differences between the adjusted values for the combination and those for the hypothetical cumulative effect shown in the table are greater than the divergence from linearity.

| | | | | | COMPRESSIVE STRENGTH (PSI) | | | | | | |
|---|---|---|---|---|---|---|---|---|---|---|---|
| Mortar | % Corn Syrup | % Citric Acid | W/C | 24 Hr. | 24 Hr. at W/C = 0.623 | Difference (x − A) Actual | Cumulative | 182 day | 182 Day at W/C = 0.623 | Difference (x − A) Actual | Cumulative |
| A | 0 | 0 | 0.623 | 3345 | 3345 | — | — | 5781 | 5781 | — | — |
| B | 0.81 | 0 | 0.599 | 2775 | 2668 | −677 | −554 | 5778 | 5555 | −226 | −898 |
| C | 0 | 0.50 | 0.547 | 3950 | 3468 | +123 | | 5819 | 5109 | −672 | |
| D | 0.81 | 0.50 | 0.510 | 4600 | 3766 | +421 | | 6969 | 5705 | −76 | |
| C | 0 | 0.50 | 0.547 | 3950 | 3468 | +123 | −514 | 5819 | 5109 | −672 | −1573 |
| E | 1.61 | 0 | 0.571 | 2955 | 2708 | −637 | | 5323 | 4880 | −901 | |
| F | 1.61 | 0.50 | 0.495 | 5233 | 4158 | +813 | | 8975 | 7131 | +1350 | |
| C | 0 | 0.50 | 0.547 | 3950 | 3468 | +123 | +99 | 5819 | 5109 | −672 | −982 |
| G | 3.23 | 0 | 0.516 | 4010 | 3321 | −24 | | 6606 | 5471 | −310 | |
| H | 3.23 | 0.50 | 0.596 | 5277 | 5048 | +1703 | | 8175 | 7821 | +2040 | |
| C | 0 | 0.50 | 0.547 | 3950 | 3468 | +123 | +584 | 5819 | 5109 | −672 | −636 |
| J | 4.84 | 0 | 0.480 | 4940 | 3806 | +461 | | 7550 | 5817 | +36 | |
| K | 4.84 | 0.50 | 0.512 | 4700 | 3863 | +518 | | 6725 | 5527 | −254 | |
| C | 0 | 0.50 | 0.547 | 3950 | 3468 | +123 | +569 | 5819 | 5109 | −672 | −1567 |
| L | 6.45 | 0 | 0.489 | 4830 | 3791 | +446 | | 6225 | 4886 | −895 | |
| M | 6.45 | 0.50 | 0.495 | 5000 | 3972 | +627 | | 6925 | 5502 | −279 | |
| B | 0.81 | 0 | 0.599 | 2775 | 2668 | −677 | −497 | 5778 | 5555 | −226 | −1172 |
| N | 0 | 1.00 | 0.561 | 3915 | 3525 | +180 | | 5369 | 4835 | −946 | |
| P | 0.81 | 1.00 | 0.517 | 4838 | 4015 | +670 | | 7181 | 5959 | +178 | |
| E | 1.61 | 0 | 0.571 | 2955 | 2708 | −637 | −457 | 5325 | 4881 | −900 | −1846 |

-continued

| Mortar | % Corn Syrup | % Citric Acid | W/C | 24 Hr. | 24 Hr. at W/C = 0.623 | Difference (x − A) Actual | Difference (x − A) Cumulative | 182 day | 182 Day at W/C = 0.623 | Difference (x − A) Actual | Difference (x − A) Cumulative |
|---|---|---|---|---|---|---|---|---|---|---|---|
| N | 0 | 1.00 | 0.561 | 3915 | 3525 | +180 | | 5369 | 4835 | −946 | |
| R | 1.61 | 1.00 | 0.502 | 4863 | 3918 | +573 | | 7562 | 6093 | +312 | |
| G | 3.23 | 0 | 0.516 | 4010 | 3321 | −24 | +156 | 6606 | 5471 | −310 | −1256 |
| N | 0 | 1.00 | 0.561 | 3915 | 3525 | +180 | | 5369 | 4835 | −946 | |
| S | 3.23 | 1.00 | 0.488 | 5260 | 4120 | +775 | | 7900 | 6188 | +407 | |
| J | 4.84 | 0 | 0.480 | 4940 | 3806 | +461 | +641 | 7550 | 5817 | +36 | −910 |
| N | 0 | 1.00 | 0.561 | 3915 | 3525 | +180 | | 5369 | 4835 | −946 | |
| T | 4.84 | 1.00 | 0.490 | 5025 | 3952 | +607 | | 7775 | 6115 | +334 | |
| L | 6.45 | 0 | 0.489 | 4830 | 3791 | +446 | +626 | 6225 | 4886 | −895 | −1841 |
| N | 0 | 1.00 | 0.561 | 3915 | 3525 | +180 | | 5369 | 4835 | −946 | |
| U | 6.45 | 1.00 | 0.487 | 5300 | 4143 | +798 | | 6900 | 5394 | −387 | |
| B | 0.81 | 0 | 0.599 | 2775 | 2668 | −677 | −554 | 5778 | 5555 | −226 | −1434 |
| V | 0 | 2.00 | 0.577 | 3745 | 3468 | +123 | | 4938 | 4573 | −1208 | |
| W | 0.81 | 2.00 | 0.524 | 4680 | 3936 | +591 | | 6850 | 5761 | −20 | |
| E | 1.61 | 0 | 0.571 | 2955 | 2708 | −637 | −514 | 5325 | 4880 | −901 | −2109 |
| V | 0 | 2.00 | 0.577 | 3745 | 3468 | +123 | | 4938 | 4573 | −1208 | |
| X | 1.61 | 2.00 | 0.501 | 5515 | 4435 | +1090 | | 7550 | 6071 | +290 | |
| x | 3.23 | 0 | 0.516 | 4010 | 3321 | −24 | +99 | 6606 | 5471 | −310 | −1518 |
| V | 0 | 2.00 | 0.577 | 3745 | 3468 | +123 | | 4938 | 4573 | −1208 | |
| Y | 3.23 | 2.00 | 0.500 | 5025 | 4033 | +688 | | 7012 | 5628 | −153 | |
| J | 4.84 | 0 | 0.480 | 4940 | 3806 | +461 | +584 | 7550 | 5817 | +36 | −1172 |
| V | 0 | 2.00 | 0.577 | 3745 | 3468 | +123 | | 4938 | 4573 | −1208 | |
| Z | 4.84 | 2.00 | 0.498 | 5055 | 4041 | +696 | | 7250 | 5795 | +14 | |
| L | 6.45 | 0 | 0.489 | 4830 | 3791 | +446 | +569 | 6225 | 4886 | −895 | −2103 |
| V | 0 | 2.00 | 0.577 | 3745 | 3468 | +123 | | 4938 | 4573 | −1208 | |
| ZZ | 6.45 | 2.00 | 0.503 | 4500 | 3633 | +288 | | 6012 | 4854 | −927 | |

We claim:

1. A hydraulic cement composition comprising from about 3.75% to about 40% of the compound $3CaO,3Al_2O_3.CaSO_4$, from about 0.1% to about 5% of lime and from about 3% to about 35% of calcium sulfate, dicalcium silicate, from about 0.1% to about 2% hydroxy polycarboxylic acid, and from about 0.25% to about 4% of starch hydrolyzate solids from a hydrolyzate having a dextrose equivalent of from about 1 to 100, said amounts being based upon the total dry weight of said composition.

2. The composition of claim 1 wherein the acid is citric acid.

3. The composition of claim 2 wherein the amount of hydrolyzate solids is from about 0.25% to about 2%.

4. The composition of claim 2 wherein the amount of the citric acid is from about 0.5% to about 2% and the amount of hydrolyzate solids is from about 0.5% to about 2%.

5. The composition of claim 1 or claim 2 wherein the starch hydrolyzate has a dextrose equivalent of from about 30 to about 70.

6. A method for preparing a cement composition comprising mixing from about 3.75% to about 40% of the ternary compound $3CaO.3Al_2O_3.CaSO_4$, from about 0.1% to about 5% of lime, from about 3% to about 35% of calcium sulfate, from about 0.1% to about 2% of a hydroxy polycarboxylic acid, from about 0.25% to about 4% of starch hydrolyzate solids from a hydrolyzate having a dextrose equivalent of from about 1 to 100, and dicalcium silicate as the substantial remainder.

7. The method of claim 6 wherein said acid is citric acid.

8. A method for increasing the compressive strength, upon full or partial hydration, of a hydraulic cement comprising from about 4% to about 40% of $3CaO.3Al_2O_3.CaSO_4$, from about 0.1 to about 5% of lime, from about 3% to about 35% of calcium sulfate, and dicalcium silicate as the substantial remainder, said method comprising the addition to said cement of a combination of admixtures consisting of from about 0.1 to about 2% of a hydroxy polycarboxylic acid and from about 0.25% to about 2% of starch hydrolyzate solids from a hydrolyzate having a dextrose equivalent of from about 1 to 100, based on the total dry weight of said cement and said admixtures.

9. The method of claim 8 wherein the combination of admixtures consists of from about 0.5% to about 2% of the acid and from about 0.5% to about 2% of the hydrolyzate solids, based on the total dry weight of said cement and said admixtures.

10. The method of claim 8 wherein the acid is citric acid and the hydrolyzate has a dextrose equivalent of from about 30 to about 70.

11. A mortar comprising the hydraulic cement composition of claim 1 or claim 2.

12. A concrete prepared from the composition of claim 1 or claim 2.

13. A grout comprising the cement composition of claim 1 or claim 2.

14. The method of claim 8 wherein the combination of admixtures consists of about 0.5% of the acid and about 1% of the hydrolyzate solids.

* * * * *